(12) United States Patent
Gallagher

(10) Patent No.: US 10,595,176 B1
(45) Date of Patent: Mar. 17, 2020

(54) VIRTUAL LANE LINES FOR CONNECTED VEHICLES

(71) Applicant: DENSO International America, Inc., Southfield, MI (US)

(72) Inventor: Brian C. Gallagher, Carlsbad, CA (US)

(73) Assignee: DENSO INTERNATIONAL AMERICA, INC., Southfield, MI (US)

( * ) Notice: Subject to any disclaimer, the term of this patent is extended or adjusted under 35 U.S.C. 154(b) by 0 days.

(21) Appl. No.: 16/135,469

(22) Filed: Sep. 19, 2018

(51) Int. Cl.
*H04W 4/44* (2018.01)
*G05D 1/02* (2020.01)
*G08G 1/16* (2006.01)
*H04W 4/46* (2018.01)

(52) U.S. Cl.
CPC ............... *H04W 4/44* (2018.02); *G05D 1/02* (2013.01); *G08G 1/166* (2013.01); *H04W 4/46* (2018.02)

(58) Field of Classification Search
CPC  G08G 1/00; G08G 1/16; G08G 1/162; G08G 1/161; G08G 1/163; G08G 1/166; G08G 1/167; B60W 30/00; B60W 30/02; B60W 30/095; B60W 30/0956; B60W 30/10; B60W 30/12; B60W 30/16; B60W 2420/40; B60W 2420/403; B60W 2420/42; G05D 1/02; G05D 1/0246; G05D 1/0257; G05D 1/0268; G05D 1/027; G05D 1/0274
See application file for complete search history.

(56) References Cited

U.S. PATENT DOCUMENTS

| | | | |
|---|---|---|---|
| 9,305,462 B2 | 4/2016 | Rubin et al. | |
| 9,598,088 B2 * | 3/2017 | Lee ................... | G06K 9/00791 |
| 2005/0232469 A1 * | 10/2005 | Schofield ........... | G06K 9/00818 |
| | | | 382/104 |
| 2014/0358321 A1 | 12/2014 | Ibrahim | |
| 2017/0193384 A1 * | 7/2017 | Mudalige .......... | B60W 50/0097 |
| 2018/0192268 A1 * | 7/2018 | Xu ............................. | G08G 1/00 |
| 2018/0198955 A1 * | 7/2018 | Watanabe .............. | B60K 35/00 |
| 2018/0339708 A1 * | 11/2018 | Geller ............. | B60W 30/18163 |
| 2018/0370365 A1 * | 12/2018 | Lee ........................ | G06F 3/0487 |
| 2019/0012912 A1 * | 1/2019 | Kim .................. | G08G 1/096783 |
| 2019/0023273 A1 * | 1/2019 | Ishioka ........... | B60W 30/18163 |
| 2019/0088125 A1 * | 3/2019 | Park ........................ | H04W 4/40 |

* cited by examiner

*Primary Examiner* — Van T Trieu
(74) *Attorney, Agent, or Firm* — Brooks Kushman P.C.

(57) ABSTRACT

A vehicle system, comprising a vehicle transceiver located in the host vehicle configured to receive data indicative of a driving path of one or more remote vehicles, a processor in communication with the vehicle transceiver and programmed to output graphical images indicative of lane markers on a road to the display utilizing at least the driving path data, and a display configured to display the graphical images.

20 Claims, 14 Drawing Sheets

US 10,595,176 B1

VIRTUAL LANE LINES FOR CONNECTED VEHICLES

TECHNICAL FIELD

The present disclosure relates to assisting occupants of vehicles in limited-visibility conditions.

BACKGROUND

Vehicles may be equipped with various cameras and sensors that can determine a vehicle's environment proximate the vehicle, but also in non-line-of-sight propagation cases. Those cameras and sensors may not be able to identify a vehicle's environment in a distance or in view of obstructions. Connected vehicles may be equipped with transceivers to exchange data with other vehicles and off-board servers to facilitate in gathering information to identify an upcoming environment along a path a vehicle is driving along that cameras and sensors cannot identify.

SUMMARY

According to one embodiment, a vehicle system in a host vehicle comprises a first sensor configured to detect a location of one or more objects outside of the host vehicle, a vehicle transceiver located in the host vehicle and configured to receive data indicative of a driving path of one or more remote vehicles, and a processor in communication with the first sensor and the vehicle transceiver and programmed to output graphical images indicative of lane markers on a road utilizing the data indicative of the driving path of one or more remote vehicles and indicative of the location of one or more objects outside of the host vehicle, and a display in communication with the processor and configured to display the graphical images.

According to a second embodiment, a vehicle system comprises a vehicle transceiver located in the host vehicle configured to receive data indicative of a driving path of one or more remote vehicles, a processor in communication with the vehicle transceiver and programmed to output graphical images indicative of lane markers on a road to the display utilizing at least the driving path data, and a display configured to display the graphical images.

According to a third embodiment, a vehicle system, comprising a vehicle transceiver located in the host vehicle configured to receive data indicative of a driving path of one or more remote vehicles, a processor in communication with the vehicle transceiver and programmed to output graphical images indicative of lane markers on a road to the display utilizing at least the driving path data, and a display configured to display the graphical images.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
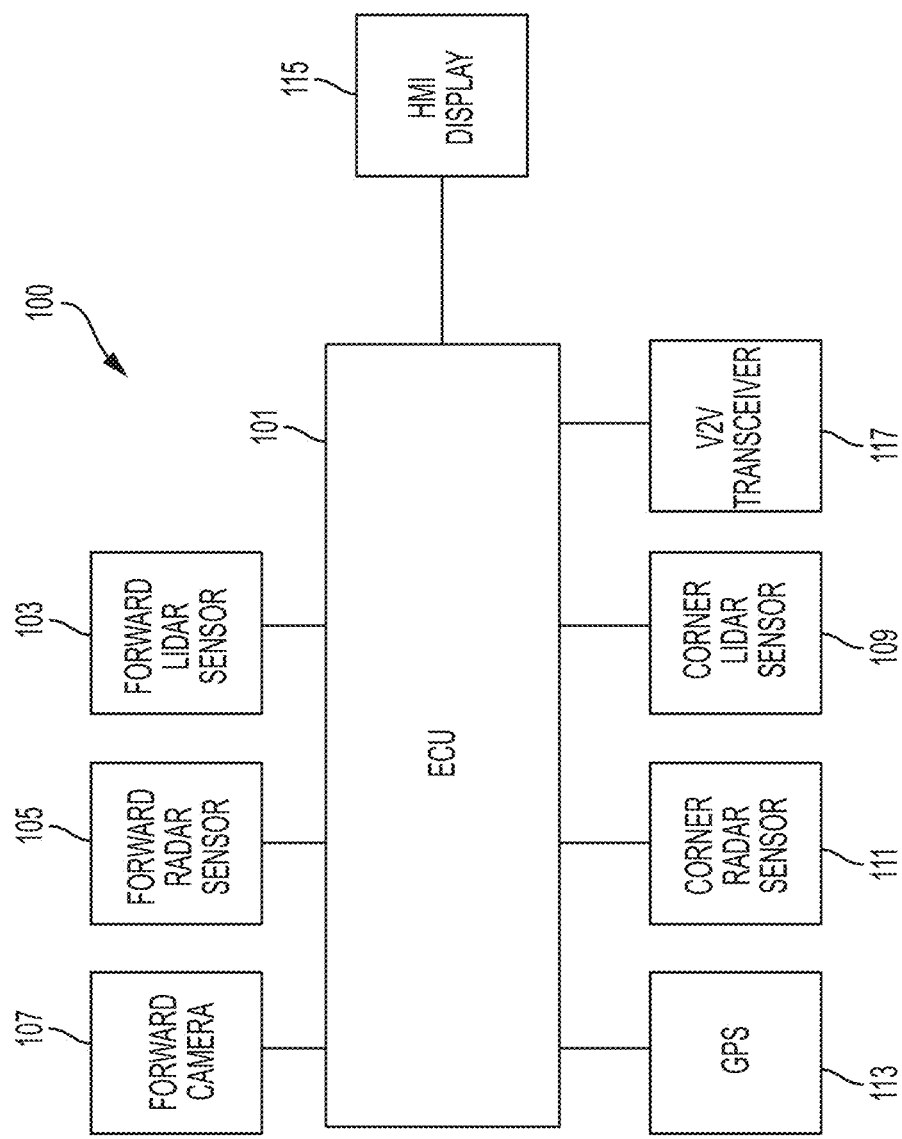
FIG. 1 illustrates an example block diagram of a vehicle system 100.

FIG. 1 illustrates an example block diagram of a vehicle system 100. The system 100 may include a controller 101. The controller 101 may be a vehicle controller such as an electronic control unit (ECU). The controller 101, also referred to herein as ECU 101, may be embodied in a processor configured to carry out instructions for the methods and systems described herein. The controller 101 may include a memory (not individually shown in FIG. 1), as well as other components, specifically processing within the vehicle. The controller 101 may be one or more computing devices such as a quad core processor for processing commands, such as a computer processor, microprocessor, or any other device, series of devices or other mechanisms capable of performing the operations discussed herein. The memory may store instructions and commands. The instructions may be in the form of software, firmware, computer code, or some combination thereof. The memory may be in any form of one or more data storage devices, such as volatile memory, non-volatile memory, electronic memory, magnetic memory, optical memory, or any other form of data storage device. In one example, the memory may include 2 GB DDR3, as well as other removable memory components such as a 128 GB micro SD card.

The controller 101 may be in communication with various sensors, modules, and vehicle systems both within and remote from a vehicle. The system 100 may include such sensors, such as various cameras, a light detection and ranging (LIDAR) sensor, a radar sensor, an ultrasonic sensor, or other sensor for detecting information about the surroundings of the vehicle, including, for example, other vehicles, lane lines, guard rails, objects in the roadway, buildings, pedestrians, etc. In the example shown in FIG. 1, the system 100 may include a forward LIDAR sensor 103, a forward radar sensor 105, a forward camera 107, a corner LIDAR sensor 109, a corner radar sensor 111. FIG. 1 is an example system and the system 100 may include more or less sensors, and sensors of varying types. Further, while the vehicle of FIG. 1 is shown with specific sensors in specific locations for purposes of illustration, the system 100 may be equipped with additional sensors at different locations within or on the vehicle, including additional sensors of the same or different type.

The forward LIDAR sensor 103 and corner LIDAR sensor 109 may each be configured to measure a distance to a target arranged external and proximal to the vehicle by illuminating the target with a pulsed laser light and measuring the reflected pulses with a sensor. The LIDAR sensors 103, 109 may then measure the differences in laser return times. This, along with the received wavelengths, may then be used to generate a digital 3-D representations of the target. The LIDAR sensors 103, 109 may have the ability to classify various objects based on the 3-D rendering of the target. For example, by determining a shape of the target, the LIDAR sensors 103, 109 may classify the target as a vehicle, curb, roadblock, buildings, pedestrian, etc. The LIDAR sensor 103 may work in conjunction with other vehicle components, such as the ECU and other sensors, to classify various targets outside of the vehicle. The LIDAR sensors 103, 109 may include laser emitters, laser receivers, and any other suitable LIDAR autonomous vehicle sensor components. The LIDAR sensors 103, 109 may be arranged within a housing configured to rotate to facilitate scanning of the environment.

As explained, FIG. 1 illustrates the forward LIDAR sensor 103 and the corner LIDAR sensor 109. The forward LIDAR sensor 109 may be used to determine what vehicles and objects are in the front peripheral of the vehicle. The corner LIDAR sensor 109 may also be utilized to detect and classify objects. The corner LIDAR sensor 109 may also be used to enhance a vehicle's peripheral view of the vehicle's surroundings.

The forward radar sensor 105 may be mounted in the front bumper of the vehicle. The corner radar sensor 111 may be mounted in the corner of the bumper. The radar sensors 105, 111 may be configured to detect and classify objects to enhance a vehicle's peripheral view of the vehicle's surroundings. The radar sensors 105, 111 may be utilized to help or enhance various vehicle safety systems. The forward radar sensor 105 may be built into a front bumper of the vehicle to determine that an object is ahead of the vehicle. The corner radar sensor 111 may be located in the rear bumper or the side of the vehicle. The corner radar sensor 111 may be utilized to determine if objects are in a driver's blind spot, as well as detecting vehicles or objects approaching from the rear on the left and right when reversing. Such functionality may allow a driver to navigate around other vehicles when changing lanes or reversing out of a parking space, as well as assist in autonomous emergency braking in order to avoid collisions that may be imminent.

The sensors, including the LIDAR sensors 103, 109 and the radar sensors 105, 111 may be mounted anywhere on the vehicle. For example, it is possible for LIDAR sensor 103 to be mounted on a roof of a vehicle with a 360-degree view of the vehicle's surroundings. Furthermore, the various sensors may surround the vehicle to provide a 360-degree view of the vehicle's surroundings. The vehicle may also be equipped with one or more cameras, one or more LIDAR sensors, one or more radar sensors, one or more ultrasonic sensors, and/or one or more other environmental sensors. Actuators may be utilized to adjust or control an angle of the field of view of the various sensors.

The vehicle system 100 may include at least one forward camera 107. The forward camera 107 may be mounted in the rear-view mirror. The forward camera 107 may also be facing out of the vehicle cabin through a vehicle's windshield to collect imagery data of the environment in front of the vehicle. The forward camera 107 may be utilized to collect information and data regarding the front of the vehicle and for monitoring the conditions ahead of the vehicle. The camera 107 may also be used for imaging the conditions ahead of the vehicle and correctly detecting the positions of lane markers as viewed from the position of the camera and the presence/absence, for example, of lighting of the head lights of oncoming vehicles. For example, the forward camera 107 may be utilized to generate image data related to a vehicle's surroundings such as lane markings ahead, and for other object detection. A vehicle may also be equipped with a rear camera (not shown) for similar circumstances, such as monitoring the vehicle's environment around the rear proximity of the vehicle.

The system 100 may also include a global positioning system (GPS) 113 that detects or determines a current position of the vehicle. In some circumstances, the GPS 113 may be utilized to determine a speed that the vehicle is traveling. The system 100 may also include a vehicle speed sensor (not shown) that detects or determines a current speed that the vehicle is traveling. The system 100 may also include a compass or three-dimensional (3D) gyroscope that detects or determines a current direction of the vehicle. Map data may be stored in the memory. The GPS 113 may update the map data. The map data may include information that may be utilized with an advanced driver assistance system (ADAS). Such ADAS map data information may include detailed lane information, slope information, road curvature data, lane marking-characteristics, etc. Such ADAS map information may be utilized in addition to traditional map data such as road names, road classification, speed limit information, etc. The controller 101 may utilize data from the GPS 113, as well data/information from the gyroscope, vehicle speed sensor, and map data, to determine a location or current position of the vehicle.

The system 100 may also include a human-machine interface (HMI) display 115. The HMI display 115 may include any type of display within a vehicle cabin. Such HMI display may include a dashboard display, navigation display, multimedia display, heads-up display, thin-film transistor liquid-crystal display (TFT LCD), etc. The HMI display 115 may also be connected to speakers to output sound related to commands or the user interface of the vehicle. The HMI display 115 may be utilized to output various commands or information to occupants (e.g. driver or passengers) within the vehicle. For example, in an automatic braking scenario, the HMI display 115 may display a message that the vehicle is prepared to brake and provide feedback to the user regarding the same. The HMI display 115 may utilize any type of monitor or display utilized to display relevant information to the occupants.

In addition to providing visual indications, the HMI display 115 may also be configured to receive user input via a touch-screen, user interface buttons, etc. The HMI display 115 may be configured to receive user commands indicative of various vehicle controls such as audio-visual controls, autonomous vehicle system controls, certain vehicle features, cabin temperature control, etc. The controller 101 may receive such user input and in turn command a relevant vehicle system of the component to perform in accordance with the user input.

An in-vehicle camera 103 may be mounted in the vehicle to monitor occupants (e.g. a driver or passenger) within the vehicle cabin. The in-vehicle camera 103 may work with a driver status monitoring system (DSM) to monitor a driver or occupant. The in-vehicle camera 103 may be utilized to capture images of an occupant in the vehicle. The in-vehicle camera 103 may obtain facial information about an occupant, such as eye-movement of the occupant and head-movement of the occupant. The in-vehicle camera may be a color camera, infrared camera, or time of flight camera A controller may receive driver status data from the DSM to determine an abnormal situation within the vehicle. The DSM employs one or more activity sensors such as a driver-facing camera, a health scanner, and an instrument panel to monitor activities performed by the driver. Based on the activity sensors, the driver status module may determine whether the driver is, for example, distracted, sick, or drowsy as the abnormal situation.

The system 100 may also include a vehicle-to-vehicle or vehicle-to-infrastructure communication module (e.g. V2X transceiver) 117. The V2X transceiver 117 may be utilized to send and receive data from objects proximate to the vehicle. Such data may include data regarding the environment surrounding the vehicle or information about the object that the vehicle is communicating with utilizing the V2X transceiver 117. In this scenario, the object may be a billboard or point-of-interest (POI) that has V2X capability to send information about the object, such as specials or detailed information that may be presented to occupants of the vehicle utilizing an HMI of the vehicle system 100. The V2X or V2V transceiver may communicate with remote vehicles may leave "bread crumbs" of their pint-point location on the path/road along with a time stamp of when the remote vehicle was on that path. The bread crumbs or other associated data may be sent from remote vehicles to the host vehicles utilize the V2X transceiver. The V2X transceiver may collect breadcrumbs on each of the vehicles it is located on and store the last 200 meters of path data. The V2X data (e.g. breadcrumb data) may also be able to identify where vehicles in the vicinity of the host-vehicle are located, there direction of travel, speed of travel, etc. The V2X or V2V transceiver may communicate on a dedicated DSRC (dedicated short-range communication) channel, or in an alternative, on a cellular channel. The V2X or V2V transceiver may communicate at 5.9 GHz (e.g. IEEE 802.11p and cellular), on 75 MHz of spectrum (5.85-5.925 GHz), and may use 10 MHz channels.

The system 100 may also include a global positioning system (GPS) 113 that detects or determines a current position of the vehicle. In some circumstances, the GPS 113 may be utilized to determine a speed that the vehicle is traveling. The system 100 may also include a vehicle speed sensor (not shown) that detects or determines a current speed that the vehicle is traveling. The system 100 may also include a compass or three-dimensional (3D) gyroscope that detects or determines a current direction of the vehicle. Map data may be stored in the memory. The GPS 113 may update the map data. The map data may include information that may be utilized with advanced driver assistance system (ADAS). Such ADAS map data information may include detailed lane information, slope information, road curvature data, lane marking-characteristics, etc. Such ADAS map information may be utilized in addition to traditional map data such as road names, road classification, speed limit information, etc. The controller 101 may utilize data from the GPS 113, as well data/information from the gyroscope, vehicle speed sensor, and map data, to determine a location or current position of the vehicle.

The system 100 may also include a human-machine interface (HMI) display 115. The HMI display 115 may include any type of display within a vehicle cabin. Such HMI displays may include a dashboard display, navigation display, multimedia display, heads-up display, thin-film transistor liquid-crystal display (TFT LCD), etc. The HMI display 115 may also be connected to speakers to output sound related to commands or the user interface of the vehicle. The HMI display 115 may be utilized to output various commands or information to occupants (e.g. driver or passengers) within the vehicle. For example, in an automatic braking scenario, the HMI display 115 may display message that the vehicle is prepared to brake and provide feedback to the user regarding the same. The HMI display 115 may utilize any type of monitor or display utilized to display relevant information to the occupants.

In addition to providing visual indications, the HMI display 115 may also be configured to receive user input via a touch-screen, user interface buttons, etc. The HMI display 115 may be configured to receive user commands indicative of various vehicle controls such as audio-visual controls, autonomous vehicle system controls, certain vehicle features, cabin temperature control, etc. The controller 101 may receive such user input and in turn command a relevant vehicle system of component to perform in accordance with the user input. The HMI display may also include a head's up display ("HUD") to project images on the windshield. The HUD may be mounted onto the dashboard and project images to be displayed on the windshield. The instrument panel may be mounted to an interior of the vehicle to control various vehicle systems or output graphical images and representations. For example, the instrument panel may include displays that monitor systems that include an air conditioner, a music player, a video player, and a GPS navigation.

The controller 101 can receive information and data from the various vehicle components including the in-vehicle camera 103, external camera 105, the GPS 113 and the HMI display 115. The controller 101 utilize such data to provide vehicle functions that may relate to driver assistance, or autonomous driving. For example, data collected by the in-vehicle camera 103, 109 and the forward camera 107 may be utilized in context with the GPS data and map data to provide or enhance functionality related to adaptive cruise control, automatic parking, parking assist, automatic emergency braking (AEB), etc. The controller 101 may be in communication with various systems of the vehicle (e.g. the engine, transmission, brakes, steering mechanism, display, sensors, user interface device, etc.). For example, the controller 101 can be configured to send signals to the brakes to slow the vehicle 100, or the steering mechanism to alter the path of vehicle, or the engine or transmission to accelerate or decelerate the vehicle. The controller 101 can be configured to receive input signals from the various vehicle sensors to send output signals to the display device, for example. The controller 101 may also be in communication with one or more databases, memory, the internet, or networks for accessing additional information (e.g. maps, road information, weather, vehicle information).

Figure 2:
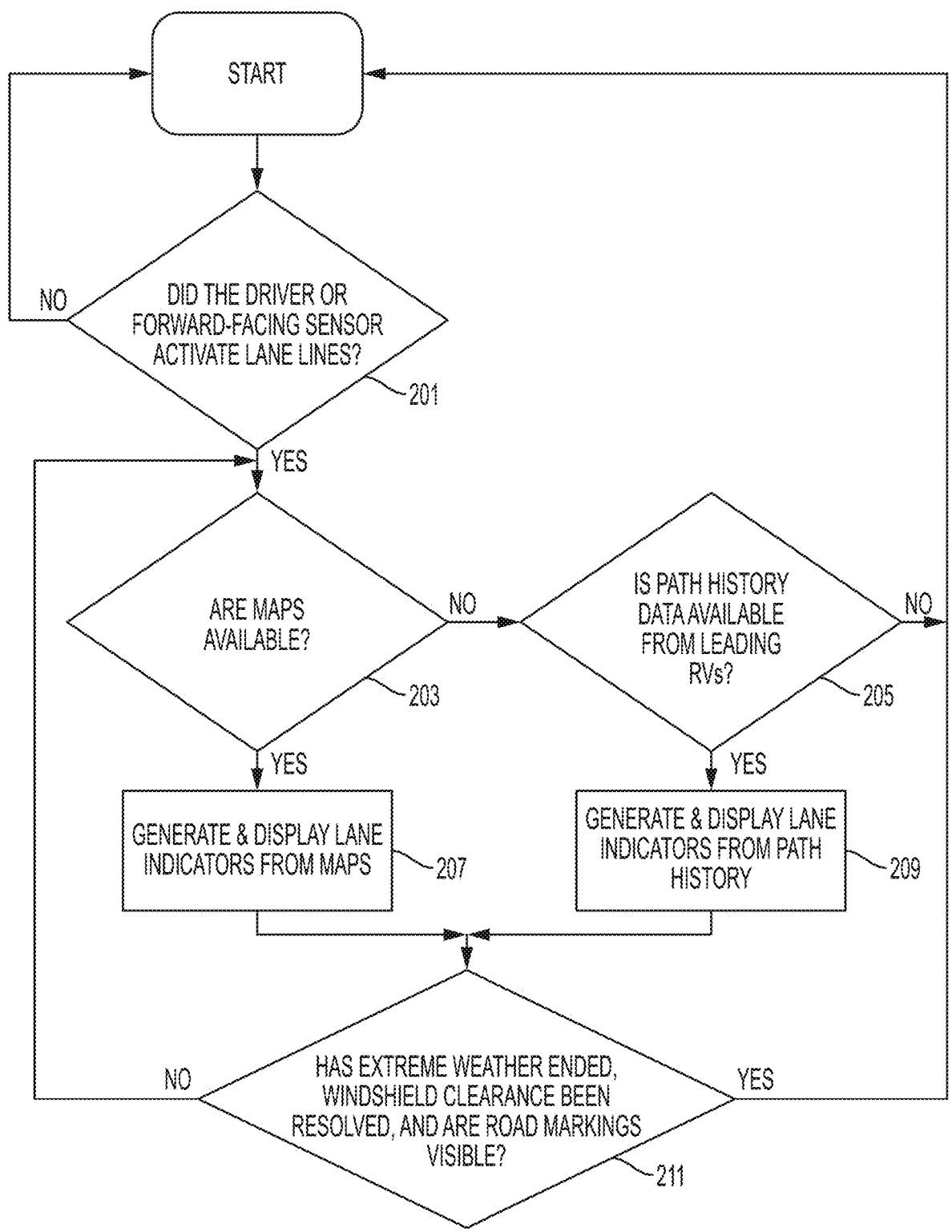
FIG. 2 illustrates an example flow chart for executing a virtual lane line application in a connected vehicle.

FIG. 2 illustrates an example flow chart for executing a virtual lane line application in a connected vehicle that acts as a host vehicle. The application may also include virtual nearby vehicles during conditions when the driver cannot see them, or an AV cannot detect them using non-V2X sensors. For example, the lane lines may be projected when lane lines can't be seen by a driver or identified by traditional non-DSRC sensors (e.g. LIDAR, cameras, radar, etc.). Furthermore, it could help identify vehicles that the driver cannot see if visibility is good (e.g. non-line-of-sight vehicle). The flow chart may be an exemplary execution of Virtual Lane lines as applied to a connected vehicle with a V2X or V2V transceiver. The connected vehicle may be an autonomous vehicle or a human-driven vehicle. The virtual lane lines may be a digitized image or overlay of an estimate as to where a road's lanes are located. The virtual lane lines may be generated utilizing data collected from other vehicles. The virtual lane lines may be activated either automatically or manually. The processor may decide if the driver or a sensor activated the virtual lane lines at step 201. In one example, a toggle switch, button or other user interface mechanism may be utilized to activate the virtual lane lines. Thus, an occupant of the vehicle may directly activate the feature. In another scenario, the virtual lane lines may be activated automatically and without human intervention. For example, one or more sensors on the vehicle may be utilized to identify a scenario to activate the virtual lane lines to be displayed on a head's up sensors.

The vehicle system may then determine if maps are available that contain detailed lane information at block 203. The vehicle system may include a navigation system that has GPS capabilities with map data. The map data may include Advanced Driver Assistance System (ADAS) data that includes very detailed information regarding road details. Such information may include the number of lanes, location of lane markings, lane starting and endings, lane merger information, etc. The map data with lane-path information may be stored on an onboard vehicle system or retrieved from an off-board server. The vehicle system may utilize a wireless transceiver to communicated with an off-board server to retrieve the map data information that includes lane-path information.

If map data is not available, the vehicle system may determine if path history data is available from remote vehicles at block 205, using content from V2X messages wirelessly transmitted between vehicles, or path history that may be synthesized from RADAR, LIDAR, and camera sensors. Remote vehicles that may be on the road class as the host vehicle or have driven the upcoming path of the host vehicle may leave "bread crumbs" of their location on the road. The bread crumbs may be utilized to define various lanes and boundaries of a road. For example, if the bread crumbs of multiple remote vehicles align along a certain path, it can be assumed a lane exists there. On the other hand, if the breadcrumbs of the remote vehicles indicate that a certain path is not crossed that a vehicle travels in, that may define the lane boundaries of a road. The breadcrumbs and associated data may be evaluated by the host vehicle or an off-board server to identify lane-path data of the roads driven by the host vehicle. The breadcrumbs or other associated data may be sent from remote vehicles to the host vehicles utilize the V2X transceiver. The V2X transceiver may collect breadcrumbs on each of the vehicles it is located on and store the last 200-300 meters of path data. The V2X data (e.g. breadcrumb data) may also be able to identify where vehicles in the vicinity of the host-vehicle are located, there direction of travel, speed of travel, etc.

In a scenario that map data that includes lane-path data is available, the vehicle system may generate and display the lane indicators utilizing the map data, as shown in block 207. The vehicle system may output virtual lane-lines on a HUD or other type of display-output device. The virtual lane lines may be generated utilizing the lane path data. For example, the virtual lane lines may indicate an outer boundary of the lanes that cannot be crossed, as well as lines that may be crossed by the moving vehicle. The HUD may overlay the virtual lane lines on the windshield to align where they should be aligned on the road. The virtual lane lines may also show various objects that are located. For example, the vehicle system may display on the windshield cars in the same path, oncoming path, and cross-path. For example, the cross-path vehicle detection may be useful at an intersection when visibility is low.

The system may also receive messages from other remote vehicles, which can include an optional parameter called BasicVehicleClass. From this parameter, the system can determine if the lead vehicles are motorcycles, small sedans, SUVs, trucks, large commercial trucks, etc. Thus, it is possible to identify the type of vehicle that is in a hazardous driving condition, despite low visibility, and output such images identifying that vehicle (e.g. motorcycle, small sedan, SUVs, trucks, etc). As such, the vehicle system can display vehicle icons on a HUD or instrument panel display.

In a scenario that map data is not available, the vehicle system may generate and display the lane indicators utilizing lane-path history from the remote vehicles, as shown in block 209. Such scenarios may include when a navigation system is not in the vehicle or off-board servers cannot be reached that store the map data due to poor network coverage. The vehicle system may output virtual lane-lines on a HUD or other type of display-output device. The virtual lane lines may be a "mini" version of the virtual lines projected in a lower portion of the windshield near the dashboard on the driver's side. This may include a HUD projecting on the windshield or on a display in an instrument panel cluster. The virtual lane lines may be generated utilizing the lane path data. For example, the virtual lane lines may indicate an outer boundary of the lanes that cannot be crossed, as well as lines that may be crossed by the moving vehicle. The HUD may also output and overlay the virtual lane lines "full-sized" on the windshield to align where they should be aligned on the road.

The system may then determine if the driver's obstruction has ended at block 211. A sensor may work with the vehicle system to determine if the obstruction (e.g. severe weather, fogged windshield, etc) has been cleared. The sensor may then utilize the data it gathers to automatically stop the virtual lane line feature from being output. For example, the vehicle system may be in communication with a weather server to be notified that a blizzard has ended in the area. In another example, a rain-sensor located on the windshield may be utilized to determine that precipitation has dropped below a threshold level that creates driver hazard. A user-prompt may also be automatically output that allows the occupant to turn on the virtual lane line feature. The occupant of the vehicle can utilize a user-interface to manually deactivate the virtual lane line feature. The user interface may include a voice recognition system or a touch switch, toggle button, press button, etc.

Figure 3A:
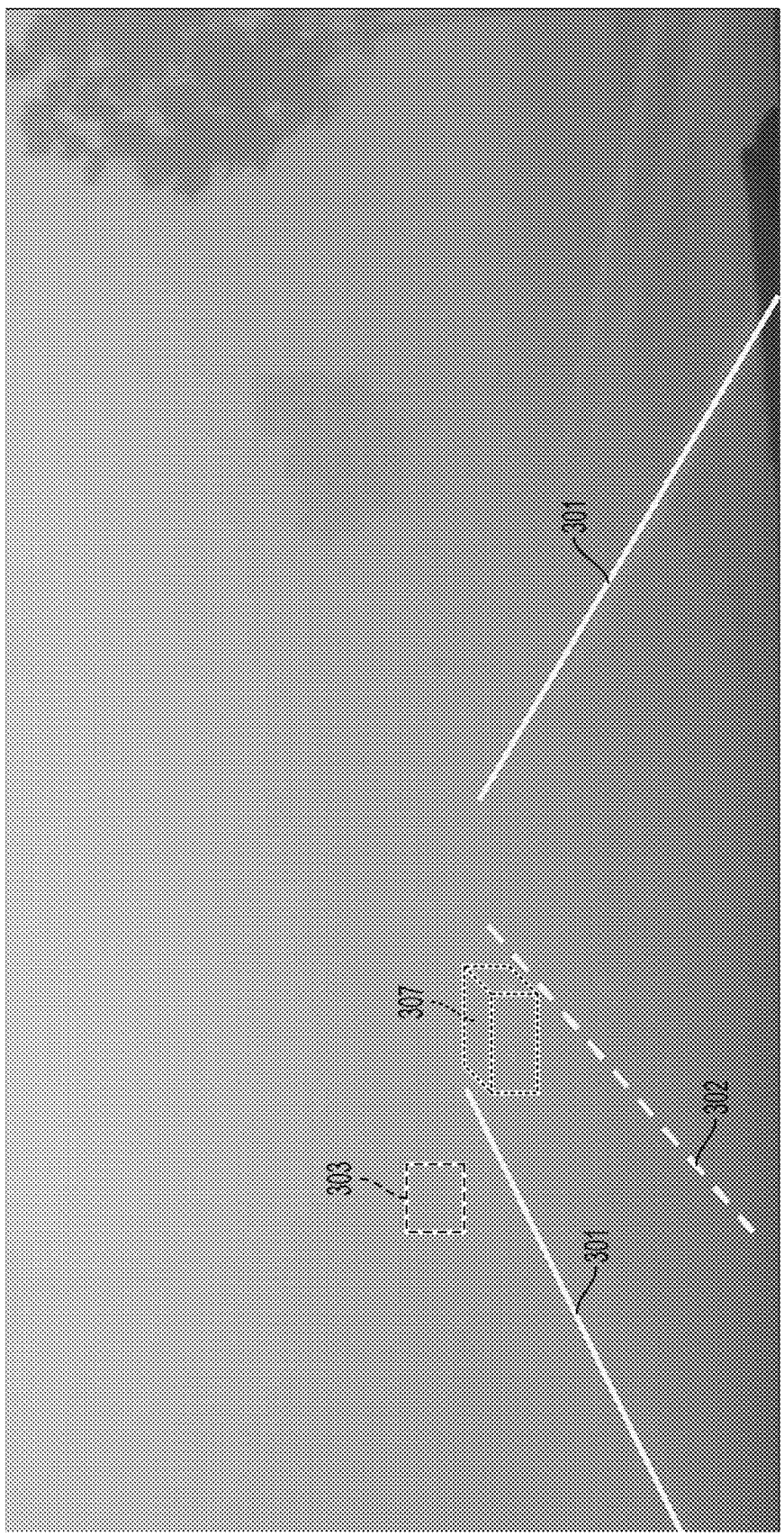
FIG. 3A illustrates an example driver's view of a freeway in a dust storm utilizing the virtual lane lines.

FIG. 3A illustrates an example driver's view of a freeway in a dust storm utilizing the virtual lane lines. As shown in the example scenario of FIG. 3A, a driver may be driving a host vehicle in a dust storm. The dust storm may obstruct the visibility of the driver. The vehicle system of the host vehicle may utilize lane-path data or driving-path data to generate virtual lane lines. As shown in FIG. 3A, the virtual lane lines may include two outer boundary virtual lines 301 that indicate where the lanes cannot merge or ends (e.g. where the road's shoulder may start). The virtual lane lines may also display a dashed line 302 that represents a separable lane for driving in the same direction. Thus, dashed line 302 may indicate a virtual lane line that could be merged passed by the host vehicle, while solid line 301 indicates that the host vehicle cannot merge past that virtual line.

The virtual lane line application may also identify objects that may be difficult to see. For example, a first-colored box 303 (e.g. any color such as red) may indicate an object that is traveling in an opposite path (e.g. oncoming path) of the host vehicle. Thus, box 303 may indicate oncoming vehicles that are on the other side of the road. Additionally, the virtual lane line application may identify objects moving in the same path utilizing a dashed box 307. The dashed box may indicate other vehicles that are driving on the same road. As shown in other scenarios below, there may also be identifies for stationary objects that are difficult to see.

Figure 3B:
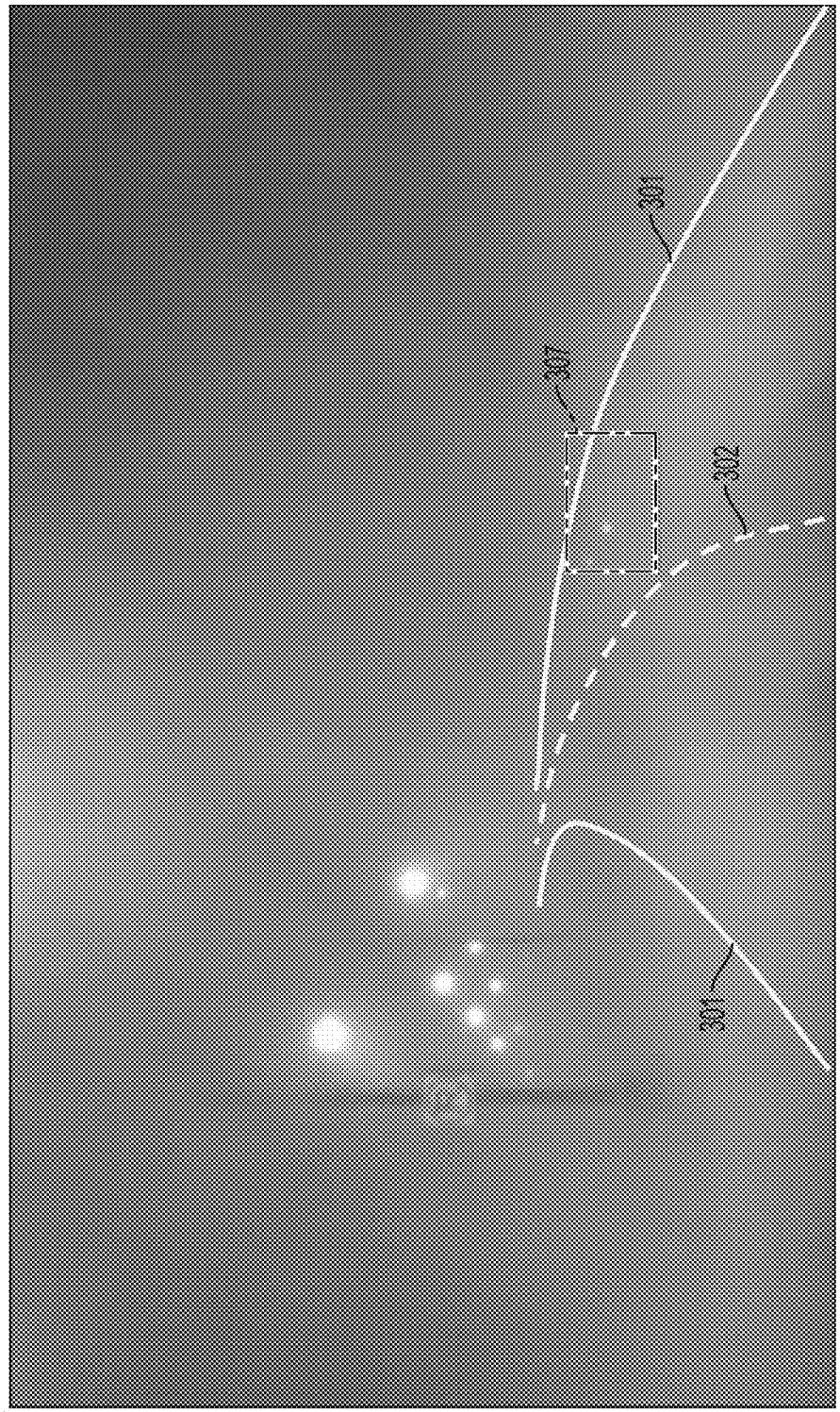
FIG. 3B illustrates an example driver's view of a freeway in a blizzard utilizing the virtual lane lines.

FIG. 3B illustrates an example driver's view of a freeway in a blizzard utilizing the virtual lane lines. As shown in the example scenario of FIG. 3B, a driver may be driving a host vehicle in a blizzard condition. The blizzard may obstruct the visibility of the driver. The vehicle system of the host vehicle may utilize lane-path data or driving-path data to generate virtual lane lines. As shown in FIG. 3B, the virtual lane lines may include two outer boundary virtual lines 301 that indicate where the lanes cannot merge or ends (e.g. where the road's shoulder may start). The virtual lane lines may also display a dashed line 302 that represents a separable lane for driving in the same direction. The virtual lane lines may also be curved. During the blizzard condition, the host vehicle may identify a vehicle 307 utilizing data from the V2X transceiver or onboard sensors (e.g. LiDar, Radar, Cameras, etc.). The virtual lane line application may be activated automatically in a blizzard condition based on weather data received from an off-board server or utilizing the windshield sensor that identifies precipitation on the windshield. For example, the off-board server may send data or an alert to the vehicle that a blizzard condition exists in the host vehicle's vicinity. In another example, the windshield sensor may trigger activation if the perception of snow is above a threshold amount.

Figure 3C:
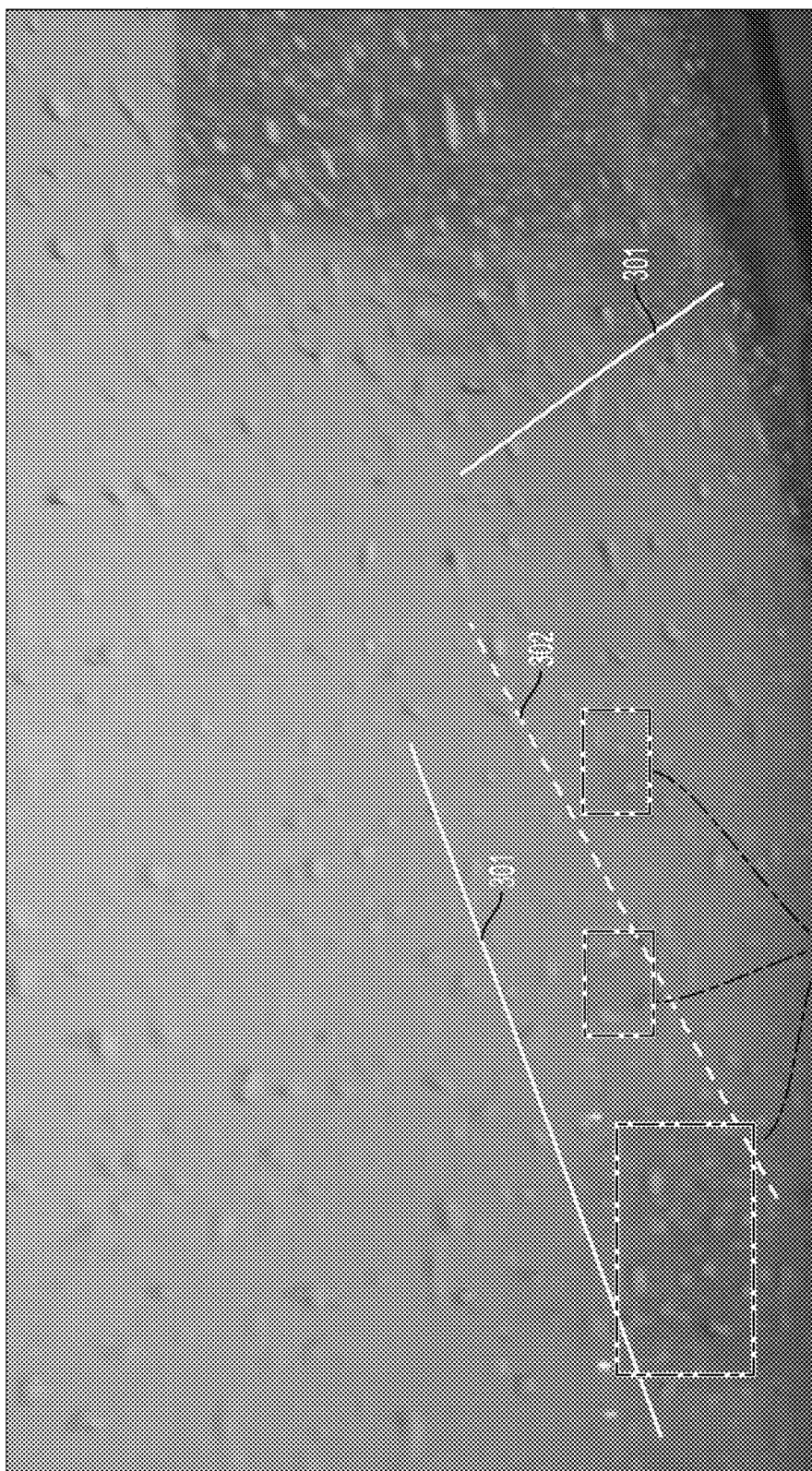
FIG. 3C illustrates an example driver's view of a freeway in a sudden downpour utilizing the virtual lane lines.

FIG. 3C illustrates an example driver's view of a freeway in a sudden downpour utilizing the virtual lane lines. As shown in the example scenario of FIG. 3C, a driver may be driving a host vehicle in a rainy condition with limited visibility because of down pour. The rainy condition may obstruct the visibility of the driver. The vehicle system of the host vehicle may utilize lane-path data or driving-path data to generate virtual lane lines in such a scenario. As shown in FIG. 3C, the virtual lane lines may include two outer boundary virtual lines 301 that indicate where the lanes cannot merge or ends (e.g. where the road's shoulder may start). The virtual lane lines may also display a dashed line 302 that represents a separable lane for driving in the same direction. During the rainy condition, the host vehicle may identify a number of vehicles 307 utilizing data from the V2X transceiver or onboard sensors (e.g. LiDar, Radar, Cameras, etc.). The virtual lane line application may be activated automatically in a rainy condition based on weather data received from an off-board server or utilizing the windshield sensor that identifies precipitation on the windshield. For example, the off-board server may send data or an alert to the vehicle that a sudden downpour condition exists in the host vehicle's vicinity. In another example, the windshield sensor may trigger activation if the perception of rain is above a threshold amount.

Figure 3D:
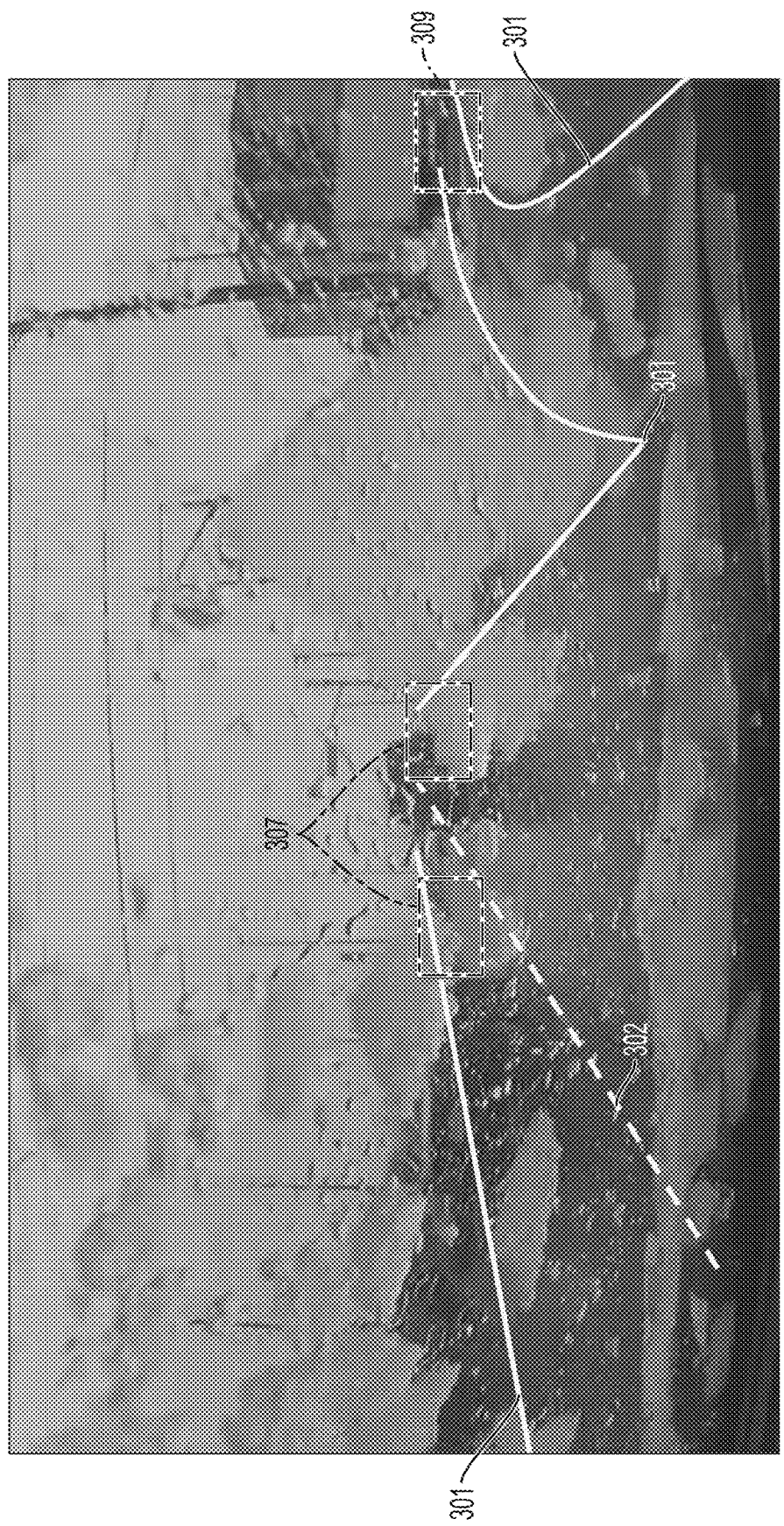
FIG. 3D illustrates an example driver's view of a freeway utilizing virtual lane lines with an icy windshield.

FIG. 3D illustrates an example driver's view of a freeway utilizing virtual lane lines with an icy windshield. As shown in the example scenario of FIG. 3D, a driver may be driving a host vehicle in with an icy windshield (or covered in snow) with limited visibility because of the ice on the windshield. The icy windshield may obstruct the visibility of the driver. The vehicle system of the host vehicle may utilize lane-path data or driving-path data to generate virtual lane lines in such a scenario. As shown in FIG. 3D, the virtual lane lines may include multiple outer boundary virtual lines 301 that indicate where the lanes cannot merge or ends (e.g. where the road's shoulder may start). A shown in FIG. 3D, the outer boundary virtual lines 301 are formed at the road and another path (e.g. exit ramp) to the right of the occupants. The virtual lane lines also display a dashed line 302 that represents a separable lane for driving in the same direction. When the windshield is frozen with ice, the host vehicle may identify two vehicles 307 utilizing data from the V2X transceiver or onboard sensors (e.g. LiDar, Radar, Cameras, etc.). The host vehicle may also recognize stationary vehicles 309 based on different shape of the outlined box 309, or different color. The virtual lane line application may be activated automatically in such a windshield based on a windshield sensor that identifies ice or snow covering the windshield. In another example, the windshield sensor may trigger activation if the coverage of ice or snow is above a threshold amount.

Figure 3E:
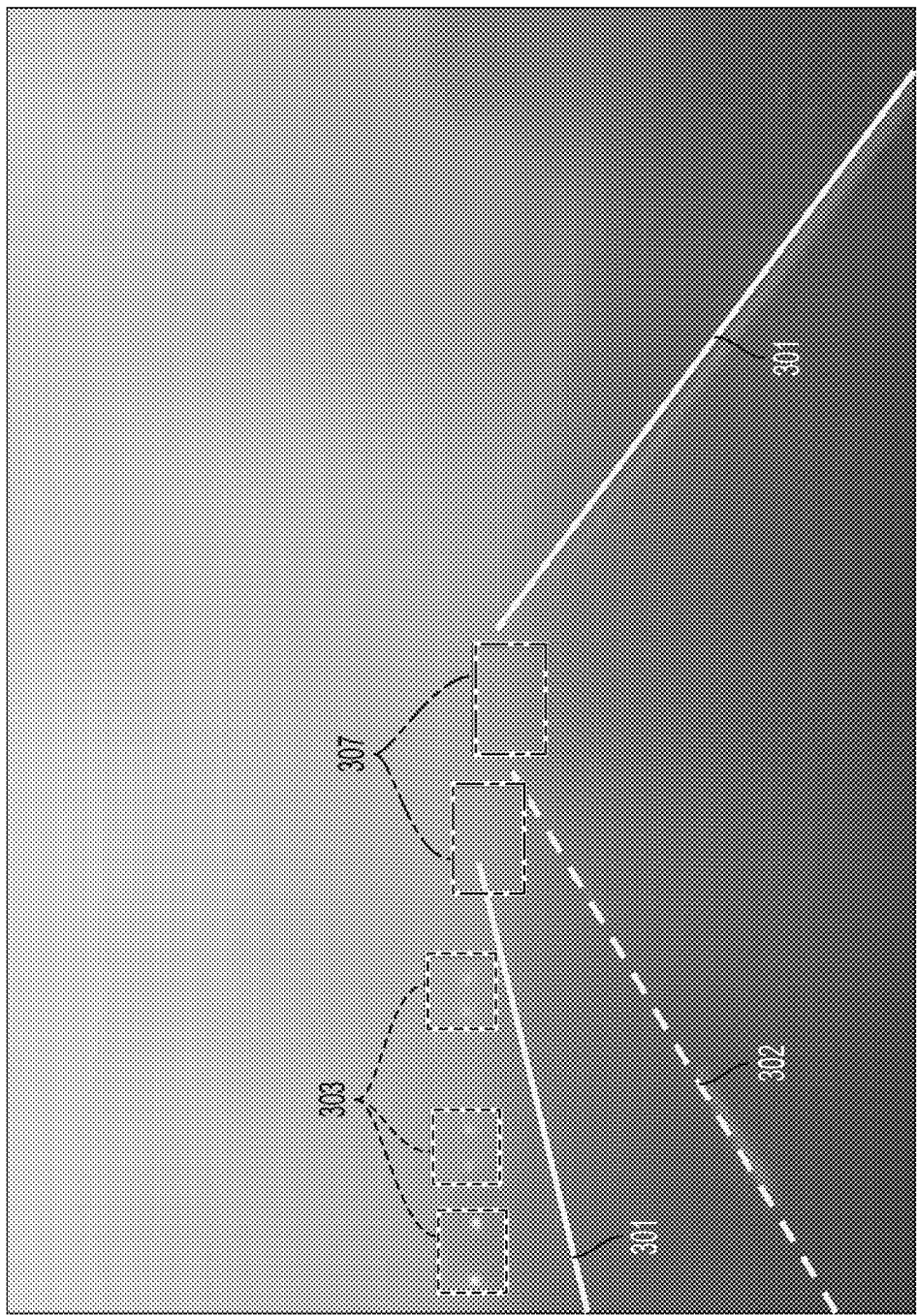
FIG. 3E illustrates an example driver's view of a freeway utilizing virtual lane lines in an area with dense fog.

FIG. 3E illustrates an example driver's view of a freeway utilizing virtual lane lines in an area with dense fog. As shown in the example scenario of FIG. 3E, a driver may be driving a host vehicle in with in a foggy condition with limited visibility. The foggy condition may obstruct the visibility of the driver. The vehicle system of the host vehicle may utilize lane-path data or driving-path data to generate virtual lane lines in such a scenario. As shown in FIG. 3E, the virtual lane lines may include two outer boundary virtual lines 301 that indicate where the lanes cannot merge or ends (e.g. where the road's shoulder may start). The virtual lane lines may also display a dashed line 302 that represents a separable lane for driving in the same direction. During the foggy condition, the host vehicle may identify a number of vehicles 307 utilizing data from the V2X transceiver or onboard sensors (e.g. LiDar, Radar, Cameras, etc.). The host vehicle may also identify several oncoming vehicles 303 may indicate oncoming vehicles that are on the other side of the road. The box outlining the oncoming vehicles 303 may be in a different shade, line-type, or flash/blink to distinguish over the vehicles driving the same direction for outlined box 307. The virtual lane line application may be activated automatically in a foggy condition based on weather data received from an off-board server or utilizing a fog sensor (e.g. same sensor utilized to automatically activate fog lamps on a vehicle) that identifies precipitation on the windshield. Additionally, a forward-facing camera that does not identify a vehicle ahead, but if radar or the V2X transceiver detects the vehicle, this may activate the virtual lane lines. In another example, the off-board server may send data or an alert to the vehicle that a foggy condition exists in the host vehicle's vicinity. In another example, the fog sensor may trigger activation if the sensor identifies fog above a threshold amount as indicated by fog sensor data.

Figure 3F:
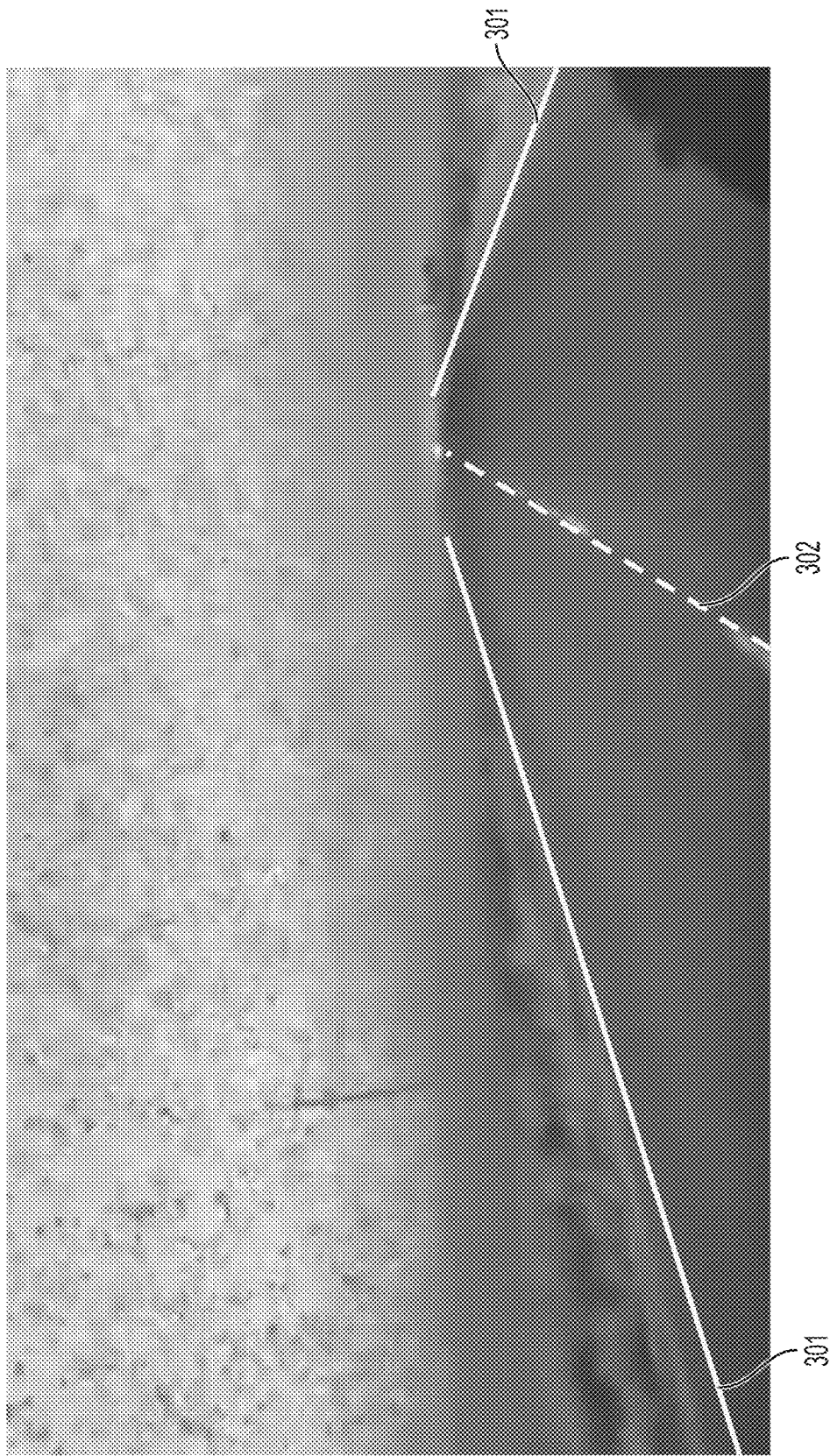
FIG. 3F illustrates an example driver's view of a freeway utilizing virtual lane lines during a locust swarm.
Figure 3G:
FIG. 3G illustrates an example driver's view of a freeway utilizing virtual lane lines during a locust swarm at or near the windshield.

FIG. 3F illustrates an example driver's view of a freeway utilizing virtual lane lines during a locust swarm. FIG. 3G illustrates an example driver's view of a freeway utilizing virtual lane lines during a locust swarm at or near the windshield. As shown in the example scenarios of FIGS. 3F and 3G, a driver may be driving a host vehicle when a locust swarm occurs in the vicinity of the vehicle, causing occupants of the vehicle to have limited visibility. As such, the locust swarm condition may obstruct the visibility of the driver. The vehicle system of the host vehicle may utilize lane-path data or driving-path data to generate virtual lane lines in such a scenario. As shown in FIG. 3F, the virtual lane lines may include two outer boundary virtual lines 301 that indicate where the lanes cannot merge or ends (e.g. where the road's shoulder may start). The virtual lane lines may also display a dashed line 302 that represents a separable lane for driving in the same direction or could be used to delineate the lanes driving in an opposite direction. Similarly, in FIG. 3G, the virtual lane lines may include two outer boundary virtual lines 301 that indicate where the lanes cannot merge or ends (e.g. where the road's shoulder may start and may also display a dashed line 302 that represents a separable lane for driving in the same direction or could be used to delineate the lanes driving in an opposite direction. The virtual lane line application may be activated automatically in a locust swarm condition based on weather data or an alert received from an off-board server or utilizing a radar sensor or camera that identifies objects that surround the vehicle. For example, the off-board server may send data or an alert to the vehicle that a foggy condition exists in the host vehicle's vicinity. In another example, the radar sensor or camera may trigger activation if the sensor identifies objects (e.g. locusts or other insects/animals) above a threshold amount.

Figure 3H:
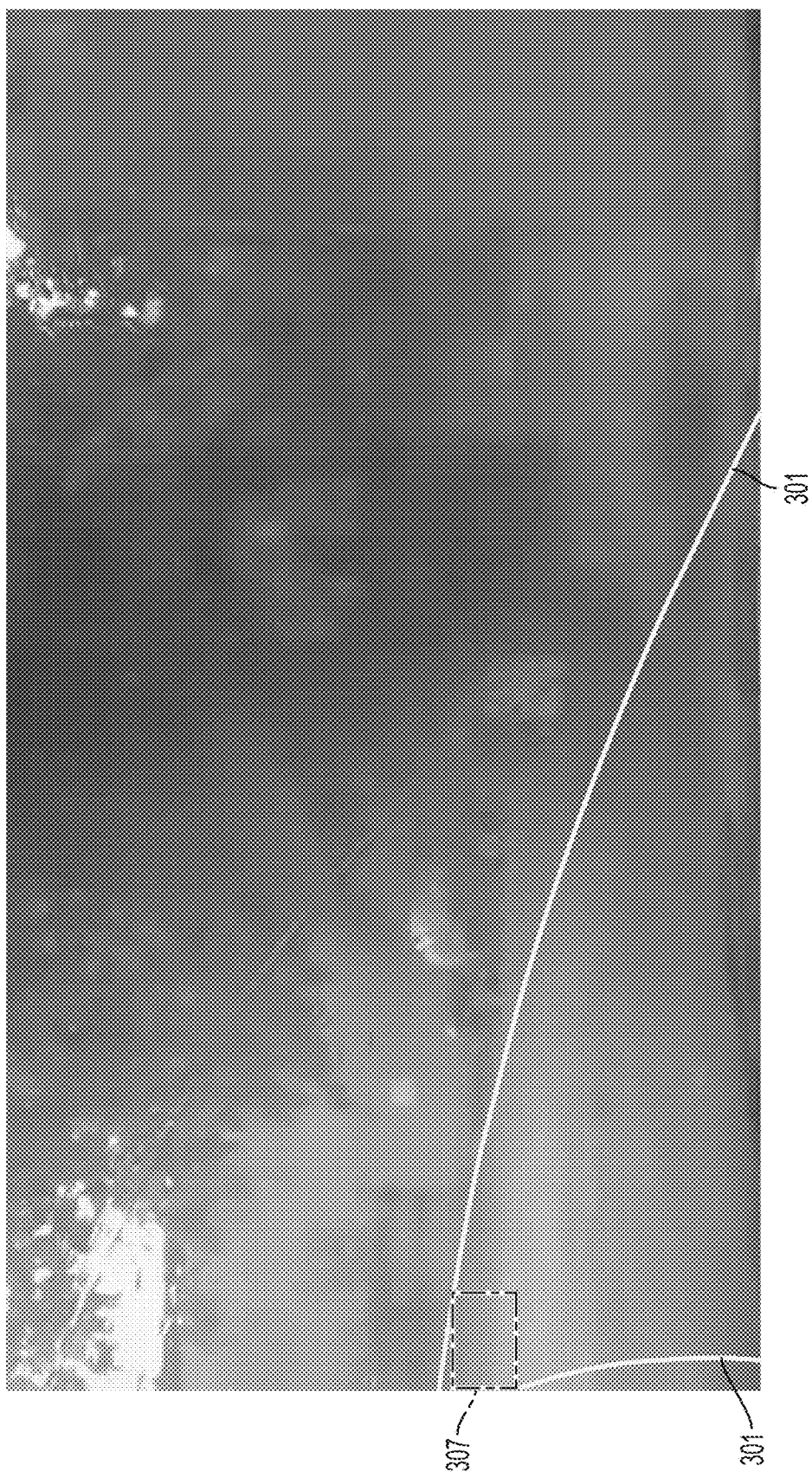
FIG. 3H illustrates an example driver's view of a freeway utilizing virtual lane lines with a fogged-up windshield.

FIG. 3H illustrates an example driver's view of a freeway utilizing virtual lane lines with a fogged-up windshield. As shown in the example scenario of FIG. 3H, a driver may be driving a host vehicle in with an unexpected fogged-up windshield that creates limited visibility. The fogged-up windshield may obstruct the visibility of the driver. The vehicle system of the host vehicle may utilize lane-path data or driving-path data to generate virtual lane lines in such a scenario. As shown in FIG. 3H, the virtual lane lines may include two outer boundary virtual lines 301 that indicate where the lanes cannot merge or ends (e.g. where the road's shoulder may start). The virtual lane lines may not display the typical dashed line (e.g. virtual dashed line 302) when on a one-way road. During the scenario of a fogged-up windshield, the host vehicle may identify at least one vehicle 307 utilizing data from the V2X transceiver or onboard sensors (e.g. LiDar, Radar, Cameras, etc.). The virtual lane line application may be activated automatically during an unexpected fogged-up windshield condition when a windshield-moisture sensor (e.g. same sensor utilized to automatically activate defrosting/defogging a windshield) that identifies precipitation on the windshield. In another example, the windshield-moisture sensor trigger activation if the sensor identifies a foggy windshield above a threshold amount.

Figure 3I:
FIG. 3I illustrates an example driver's view of a freeway utilizing virtual lane lines with a broken windshield.

FIG. 3I illustrates an example driver's view of a freeway utilizing virtual lane lines with a broken windshield. As shown in the example scenario of FIG. 3I, a driver may be driving a host vehicle when an object shatters or breaks the windshield. The broken windshield may obstruct the visibility of the driver. The vehicle system of the host vehicle may utilize lane-path data or driving-path data to generate virtual lane lines to assist the driver's visibility of the road ahead. As shown in FIG. 3I, the virtual lane lines may include two outer boundary virtual lines 301 that indicate where the lanes cannot merge or ends (e.g. where the road's shoulder may start). The virtual lane lines may not display the typical dashed line (e.g. virtual dashed line 302) when on a one-way road. The virtual lane line application may also identify a stationary object in line 307. Such stationary objects may include a stationary vehicle, bike, pedestrian, etc. The virtual lane line application may be activated automatically utilizing the windshield sensor that identifies broken glass for a vehicle's alarm system. In another example, the windshield sensor may trigger activation if the sensor detects a significant damage of the windshield above a threshold amount.

Figure 3J:
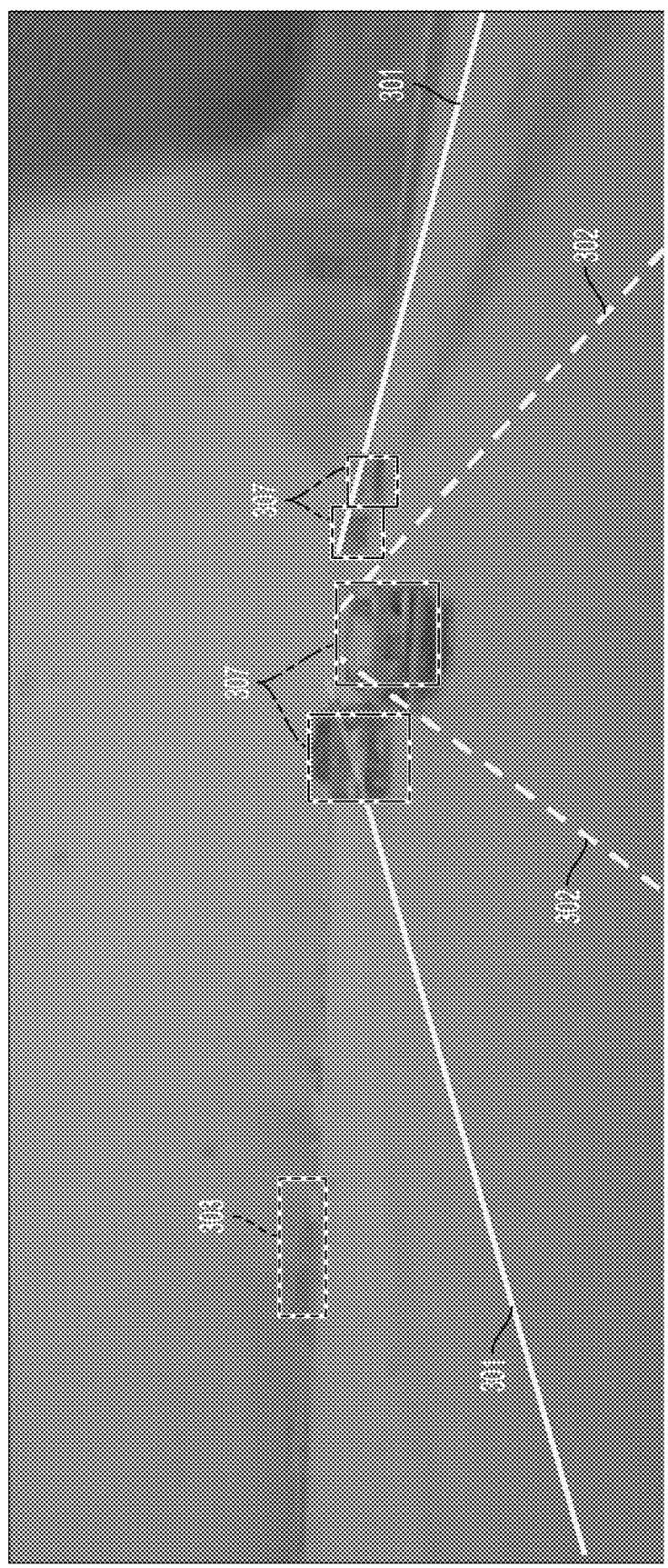
FIG. 3J illustrates an example driver's view of a freeway with heavy snow when utilizing virtual lane lines.

FIG. 3J illustrates an example driver's view of a freeway with heavy snow when utilizing virtual lane lines. As shown in the example scenario of FIG. 3J, a driver may be driving a host vehicle with heavy snow on the roads that creates limited visibility of the lane lines. The vehicle system of the host vehicle may utilize lane-path data or driving-path data to generate virtual lane lines in such a scenario. As shown in FIG. 3J, the virtual lane lines may include two outer boundary virtual lines 301 that indicate where the lanes cannot merge or ends (e.g. where the road's shoulder may start). The virtual lane lines may also display multiple dashed lines 302 that represents a separable lane for driving in the same direction and to merge across to and from. During the snowy condition, the host vehicle may identify a number of vehicles 307 utilizing data from the V2X transceiver or onboard sensors (e.g. LiDar, Radar, Cameras, etc.). The host vehicle may also identify one or more oncoming vehicles 303 that may indicate vehicles driving in an opposite direction that are on the other side of the road. The box outlining the oncoming vehicles 303 may be in a different shade, line-type, or flash/blink to distinguish over the vehicles driving the same direction for outlined box 307. The virtual lane line application may be activated automatically in a snowy condition based on weather data received from an off-board server. For example, the off-board server may send data or an alert that heavy snow has fell on the current road and a possible snowy condition exists in the host vehicle's vicinity.

Figure 3K:
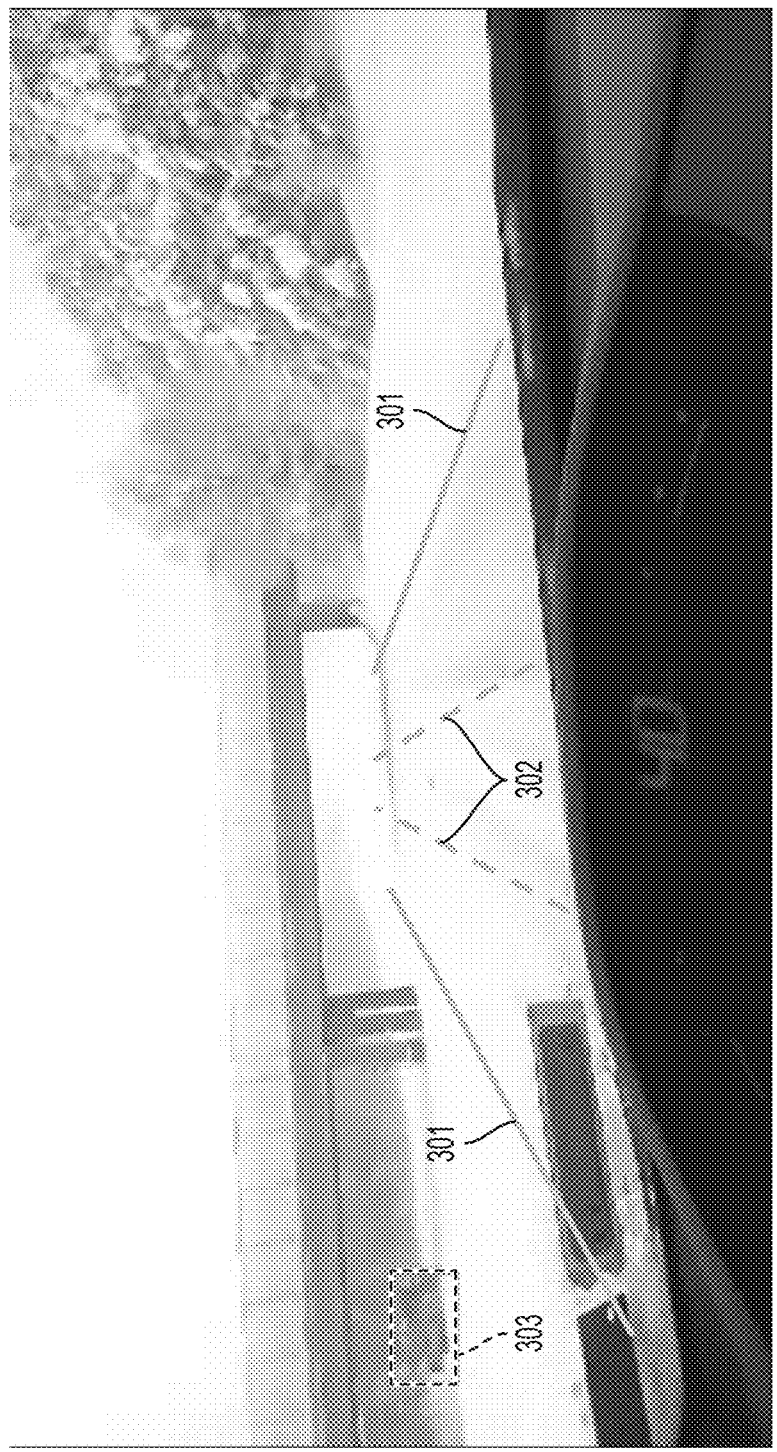
FIG. 3K illustrates an example driver's view of a freeway with heavy snow when utilizing virtual lane lines based on utilizing path history data.

FIG. 3K illustrates an example driver's view of a freeway with heavy snow when utilizing virtual lane lines utilizing path history data. As shown in the example scenario of FIG. 3K, a driver may be driving a host vehicle with heavy snow on the roads that creates limited visibility of the lane lines. The vehicle system of the host vehicle may utilize lane-path data or driving-path data to generate virtual lane lines in such a scenario. In such a scenario, no vehicles are traveling the same path as the host vehicle, thus the host vehicle may need to utilize stored lane path data (rather than data from other vehicles) to create the road boundaries. As shown in FIG. 3K, the virtual lane lines may include two outer boundary virtual lines 301 that indicate where the lanes cannot merge or ends (e.g. where the road's shoulder may start). The virtual lane lines may also display multiple dashed lines 302 that represents a separable lane for driving in the same direction and to merge across to and from. The host vehicle may identify one or more oncoming vehicles 303 that may indicate vehicles driving in an opposite direction that are on the other side of the road, however, those vehicles do not have lane path data to push to the host vehicle. The box outlining the oncoming vehicles 303 may be in a different shade, line-type, or flash/blink to distinguish over the vehicles driving the same direction. The virtual lane line application may be activated automatically in a snowy condition based on weather data received from an off-board server. For example, the off-board server may send data or an alert that heavy snow has fell on the current road and a possible snowy condition exists in the host vehicle's vicinity.

Figure 4B:
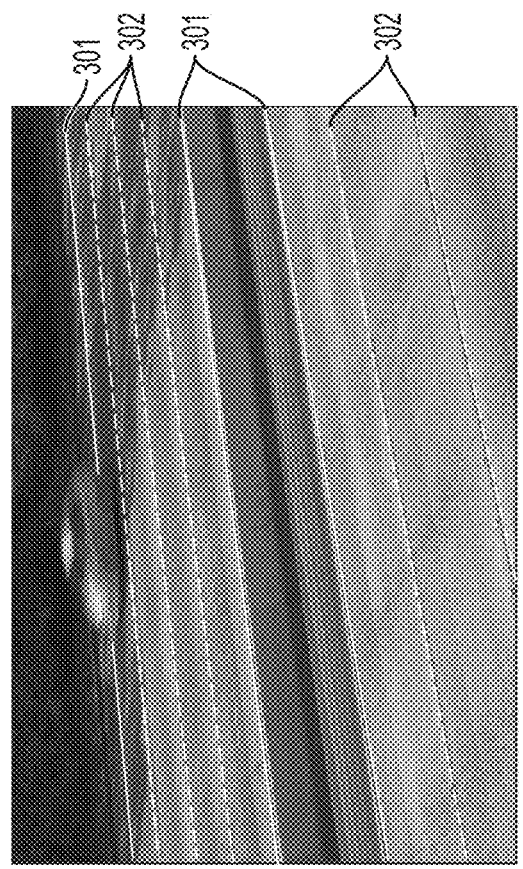
FIG. 4B illustrates an example view of a bird's eye-view of a freeway with worn-down lane lines.
Figure 4A:
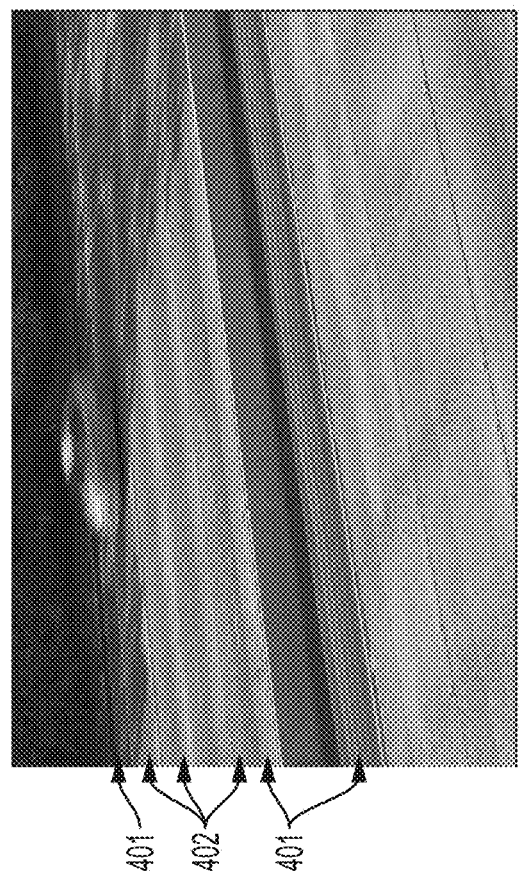
FIG. 4A illustrates an example view of a bird's eye-view of a freeway with worn-down lane lines.

FIG. 4A illustrates an example view of a bird's eye-view of a freeway with worn-down lane lines. From the bird's eye angle in FIG. 4A, the visibility of the road's lane markers may be worn down. Thus, even when the weather or vehicle's environment is in good, clear operating condition, an occupant or driver of a vehicle may have difficulty determining where the lane lines are. For example, 401 indicates the outer boundary shoulder lines of the road shown in FIG. 4A, which is difficult to see from the occupant's perspective. In another example, 402 indicates the dashed lines of the road shown in FIG. 4A, which is difficult to see from the occupant's perspective.

FIG. 4B illustrates an example view of a bird's eye-view of a freeway with worn-down lane lines. As shown in FIG. 4B, the virtual lane lines may include two outer boundary virtual lines 301 that indicate where the lanes cannot merge or ends (e.g. where the road's shoulder may start). The virtual lane lines may also display multiple dashed lines 302 that represents a separable lane for driving in the same direction and to merge across to and from. In the scenario when the road's lane markers are worn down, the virtual lane line application may be activated manually by a user. In another condition, the virtual lane line application may be activated automatically based on data received from an off-board server or map data. For example, the off-board server may send data or an alert that poor road visibility is on the current road and in the host vehicle's vicinity.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle system in a host vehicle, comprising:
    a first sensor configured to detect a location of one or more objects outside of the host vehicle;
    a vehicle transceiver located in the host vehicle and configured to communicate with one or more remote vehicles and receive data indicative of a historic driving path of the one or more remote vehicles from a vehicle-to-vehicle or vehicle-to-infrastructure transceiver;
    a processor in communication with the first sensor and the vehicle transceiver and programmed to output graphical images indicative of lane markers on a road utilizing the data indicative of the historic driving path of one or more remote vehicles and indicative of the location of the one or more objects outside of the host vehicle; and
    a display in communication with the processor and configured to display the graphical images.

2. The vehicle system of claim 1, wherein the processor is programmed to output the graphical images indicative of lane markers on a road in response to activation of a user-interface command.

3. The vehicle system of claim 1, wherein the processor is programmed to output graphical images indicative of cross-path vehicles utilizing at least data received from the first sensor.

4. The vehicle system of claim 1, wherein the processor is programmed to output graphical images indicative of oncoming vehicles utilizing at least data received from the first sensor.

5. The vehicle system of claim 1, wherein the processor is programmed to output graphical images indicative of same-path vehicles utilizing at least data received from the first sensor.

6. The vehicle system of claim 1, wherein the processor is further configured to output the graphical images in response to data indicative of a hazardous driving condition, wherein the data indicative of the hazardous driving condition is not from a radar sensor or camera.

7. The vehicle system of claim 1, wherein the graphical images indicative of lane markers on the road are not generated from a map database.

8. The vehicle system of claim 1, wherein the display includes a heads-up display (HUD) or an instrument panel display.

9. A vehicle system, comprising:
    a vehicle transceiver located in a host vehicle configured to receive data indicative of a historic driving path of one or more remote vehicles from a vehicle-to-vehicle or vehicle-to-infrastructure transceiver;
    a processor in communication with the vehicle transceiver and programmed to output graphical images indicative of lane markers on a road to a display utilizing at least the historic driving path data; and
    the display configured to display the graphical images.

10. The vehicle system of claim 9, wherein the processor is configured to output graphical images indicative of oncoming vehicles to the display in response to activation of a user-interface command, wherein the graphical images utilize at least the historic driving path data.

11. The vehicle system of claim 9, wherein the processor is configured to output graphical images indicative of cross-path vehicles to the display utilizing at least the historic driving path data.

12. The vehicle system of claim 9, wherein the processor is configured to output graphical images indicative of same-path vehicles to the display utilizing at least the historic driving path data.

13. The vehicle system of claim 9, wherein the vehicle transceiver is further configured to send data indicative of a host vehicle driving path to the one or more remote vehicles.

14. The vehicle system of claim 9, wherein the processor is configured to output to the display graphical images indicative of lane markers on the road in response to data indicative of a hazardous driving condition.

15. The vehicle system of claim 14, wherein the data indicative of the hazardous driving condition includes at least windshield sensor data.

16. The vehicle system of claim 14, wherein the data indicative of the hazardous driving condition includes at least weather data.

17. The vehicle system of claim 14, wherein the data indicative of the hazardous driving condition includes data generated by a fog-detection sensor of the vehicle.

18. The vehicle system of claim 9, wherein the processor is configured to output to the display the graphical images indicative of lane markers on the road in response to activation of an interface of the vehicle system.

19. The vehicle system of claim 9, wherein the display includes a heads-up display (HUD) or an instrument panel display.

20. A method of outputting graphical images with a vehicle system, comprising:
    receiving, from one or more remote vehicles via a vehicle transceiver, data indicative of a driven path by the one or more remote vehicles from a vehicle-to-vehicle or vehicle-to-infrastructure transceiver;
    generating, utilizing a processor, graphical images indicative of lane markers on a road utilizing the data indicative of a driven path by the one or more remote vehicles; and
    displaying the graphical images indicative of lane markers on the road on one or more displays of the vehicle system.

* * * * *